(12) United States Patent
Kirby (10) Patent No.: US 7,785,166 B1
(45) Date of Patent: Aug. 31, 2010

(54) SOUND-CONTROLLABLE GAME CALL

(76) Inventor: Richard C. Kirby, 6426 W. Quaker Rd., Orchard Park, NY (US) 14127

( * ) Notice: Subject to any disclaimer, the term of this patent is extended or adjusted under 35 U.S.C. 154(b) by 889 days.

(21) Appl. No.: 11/510,183

(22) Filed: Aug. 24, 2006

(51) Int. Cl.
*A63H 3/31* (2006.01)

(52) U.S. Cl. .................. 446/188; 446/176; 446/193; 446/213; 446/397

(58) Field of Classification Search ............ 446/176, 446/180, 188, 192, 193, 202, 207, 208, 209, 446/213, 300, 397, 416, 216
See application file for complete search history.

(56) References Cited

U.S. PATENT DOCUMENTS

| | | | |
|---|---|---|---|
| 1,200,256 A | | 10/1916 | Steiner |
| 1,805,566 A | * | 5/1931 | Cipra .................. 446/192 |
| 2,116,183 A | * | 5/1938 | Beach et al. ............ 446/193 |
| 2,436,886 A | | 3/1948 | Gowland |
| 3,815,283 A | | 6/1974 | Piper |
| 3,900,993 A | * | 8/1975 | Betters .................. 446/193 |
| 3,968,592 A | * | 7/1976 | Piper .................... 446/193 |
| 4,138,800 A | | 2/1979 | Lege |
| 4,159,705 A | * | 7/1979 | Jacoby .................. 124/63 |
| 4,193,513 A | * | 3/1980 | Bull, Jr. ................. 222/1 |
| 4,737,130 A | | 4/1988 | Mann |
| 4,810,226 A | | 3/1989 | Takahashi et al. |
| 4,915,660 A | | 4/1990 | Overholt, Sr. |
| 4,950,198 A | | 8/1990 | Repko, Jr. |
| 4,976,648 A | | 12/1990 | Meline |
| 5,402,102 A | * | 3/1995 | Lachance ............ 340/404.1 |
| 5,549,498 A | | 8/1996 | Kirby |
| 5,613,891 A | * | 3/1997 | Lamo ................... 446/26 |
| 5,704,154 A | * | 1/1998 | Galfidi, Jr. ............. 42/90 |
| 6,042,447 A | * | 3/2000 | Thompson ............. 446/193 |
| 6,053,793 A | * | 4/2000 | Green ................... 446/192 |
| 6,120,341 A | * | 9/2000 | Hafford ................. 446/208 |
| 6,231,417 B1 | * | 5/2001 | Palmer .................. 446/207 |
| 6,240,671 B1 | * | 6/2001 | Galfidi, Jr. ............. 42/90 |
| 6,491,564 B1 | | 12/2002 | Miller |
| 6,514,116 B2 | | 2/2003 | Abbas |
| 6,575,804 B1 | | 6/2003 | Primos |
| 6,755,714 B1 | * | 6/2004 | Huddleston ............ 446/207 |
| 6,783,422 B1 | | 8/2004 | Bean |
| 6,926,578 B1 | | 8/2005 | Casias et al. |
| 7,462,091 B1 | * | 12/2008 | Bean .................... 446/208 |
| 2003/0082988 A1 | | 5/2003 | Gendron et al. |
| 2005/0079789 A1 | * | 4/2005 | Bishop ................. 446/207 |

OTHER PUBLICATIONS

Quaker Boy "Hunter's First Choice" 1999 Hunter's Catalog, advertisements for "Bleat-in-Heat Deer Call" and "Bleat-in-Heat II Deer Call," 1999, p. 15.

Quaker Boy Game Calls advertisement, "New Products 1991," 1991.

(Continued)

*Primary Examiner*—Gene Kim
*Assistant Examiner*—Scott Young
(74) *Attorney, Agent, or Firm*—James C. Simmons (57) ABSTRACT

A game call for controlling sound quality (volume and pitch) of an internal bellows call. A hand-manipulable external bellows or other device provides air through an aperture to the internal bellows.

11 Claims, 7 Drawing Sheets

OTHER PUBLICATIONS

Quaker Boy World Champion Game Calls and Accessories advertisement, "New for Ninety-Two," 1992.
Quaker Boy World Champion Calls product packaging for "Bleat-In-Heat Deer Call," 2001.
PRIMOS Hunting Calls, Internet (primos.com) advertisement for "The CAN 3 Pak," 2006.
PRIMOS Hunting Calls, Internet advertisement (primos.com) for "The Original CAN," 2006.
PRIMOS product packaging and instructions for "Original 'The CAN' ESTRUS BLEAT Model No. 711," 2006.

* cited by examiner

SOUND-CONTROLLABLE GAME CALL

The present invention relates generally to game calls, i.e., devices for making the sounds of deer and antelope and other wild game for the purposes of attracting the game for hunting thereof.

One type of game call, examples of which are shown in my U.S. Pat. No. 5,549,498 and in U.S. patent application publication 2003/0082988 to Wayne Gendron and R. Christian Kirby, the disclosures of which are incorporated herein by reference, utilizes a reed or diaphragm over which air is caused to pass to vibrate thereby making the desired game sounds. The passage of air may be effectuated by a bellows, such as in my aforesaid patent, or by a mouthpiece, such as in the aforesaid application publication, or by other means. Other examples of such game calls and devices otherwise of interest to the present invention may be found in U.S. Pat. Nos. 1,200,256; 2,116,183; 2,436,886; 3,968,592; 4,138,800; 4,737,130; 4,810,226; 4,915,660; 4,950,198; 4,976,648; 6,231,417; 6,491,564; 6,514,116; 6,575,804; 6,755,714; 6,783,422; 6,926,578; and U.S. patent application publication 2005/0079789, all of which are incorporated herein by reference.

U.S. Pat. No. 1,200,256 discloses a sound producing device wherein an air compressing bellows is operated to pressurize a sound produced bellows by passing air from the air compressing bellows through openings in a top cheek of the air compressing bellows and a bottom cheek of the sound produced bellows respectively, the opening being fitted with an exhaust valve. Air is received into the air compressing bellows through a hole in the bottom cheek thereof, the hole being fitted with a valve. The sound produced bellows is spring-biased to contract, and the air compressing bellows is spring-biased to expand. A hole in the top cheek of the sound produced bellows leads to a small reed instrument or pipe ending in a tube. The sound production continues automatically after the pressure on the air compressing bellows has been discontinued and the sound produced bellows completely filled with air, the air being slowly expelled through the sound producing instrument, to produce a squealing or whining noise.

U.S. Pat. No. 2,116,183 discloses a duck call which comprises an upper end block with an operating stem and a lower end block, the end blocks connected by an air-tight bellows, which is spring-biased to expand and which is received within a housing. A sound-reed is received in a central well of the lower block and serpentine air passageways or grooves communicate with the central well. Pressure on the stem leads to the outflow of air and the sounding of the reed.

U.S. Pat. No. 2,436,886 discloses a sound producing device carried on a rotatable disc for making sounds for a toy when the device is rotated. The device has a weighted bellows received in a cylindrical housing and alternately expands and contracts as it is rotated. The device employs reeds cooperating with orifices in an end of the device to produce sound when the bellows is collapsed, and the other end wall has air receiving holes.

U.S. Pat. No. 6,755,714 discloses a game caller which utilizes an air tube for remote operation and is said to be applicable to any type of blow-through or inhale call including grunt tubes for deer and doe bleats. The air tube connects to an inflatable air reservoir made of semi-stretchable material for containment of air sufficient to operate the call to which it is attached and in fluid communication with. The air tube end may contain a mouth-piece or alternatively a bellows.

Figure 1:
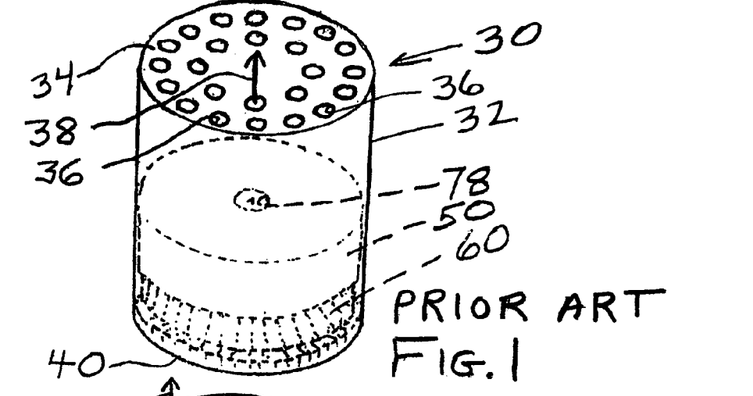
FIG. 1 is a perspective view of a device for calling game in accordance with the prior art.

A successful reeded call which my company, Quaker Boy, Inc., has sold since the 1990es is one known as the BLEAT-IN-HEAT deer call. This call is illustrated generally at 30 in FIG. 1 of the appended drawings and comprises a cylindrical housing or can 32 composed of plastic or other suitable material and having an integral or otherwise suitably connected front end wall 34 with a plurality of apertures, illustrated at 36, therein to release air therefrom, as illustrated at 38. The can 32 may, for example, have a length of about 2 inches and a diameter of about 1⅞ inch.

Figures 7, 8, 9, 10, 11, 12, 13:
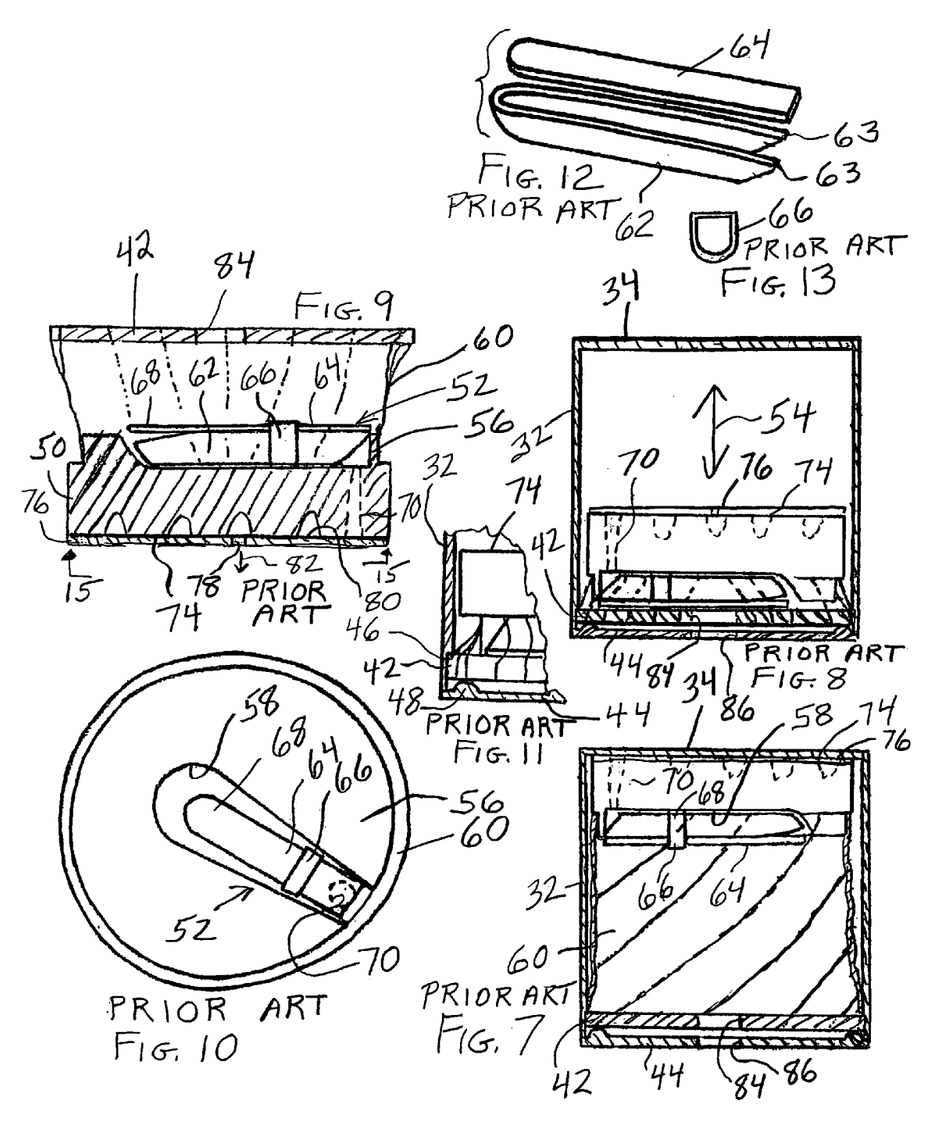
FIG. 7 is a longitudinal sectional view (with parts not shown in section) of the calling device, showing the locations of internal components during the making of a sound therewith.
FIG. 8 is a view similar to that of FIG. 7 of the calling device, showing the locations of internal components prior to the making of a sound therewith.
FIG. 9 is a view similar to that of FIG. 7 of internal components of the calling device.
FIG. 10 is a plan view of the rear side of a weighted member for the calling device, showing a reed assembly therefor.
FIG. 11 is a partial view, partly in section, of the calling device.
FIG. 12 is an expanded view of a reed and trough of the reed assembly.
FIG. 13 is an end view of a connector for the reed and trough.

A suitable rear wall or partition 40 is fitted or connected to the other end of the can 32. Referring to FIGS. 8 and 11, the wall 40 comprises an inner disc 42 composed or cardboard or other suitable material and an outer disc 44 composed of plastic or other suitable material in order to protect the cardboard 42 from becoming wet. The can 32 has an enlarged diameter adjacent the corresponding end which provides a shoulder, illustrated at 46, for receiving and suitably positioning the inner disc 42. The outer disc 44 has a ring 48 thereon which is adjacent its edge and concentric therewith for pressingly holding the inner disc 42 in position and is adhesively attached to the can 32 along its outer edge or otherwise suitably attached to the can 32.

Figure 14:
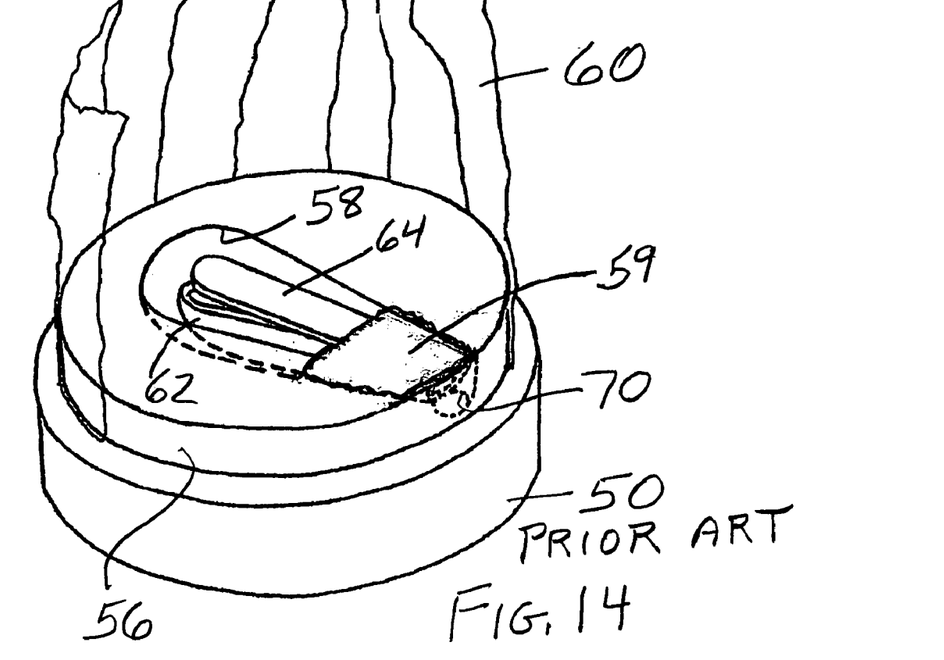
FIG. 14 is a partial perspective view of the weighted member.

Referring to FIG. 9, a weighted cylindrical member 50, which contains the hereinafter described reed assembly 52 and which is composed of ceramic or other suitable material, is received within the can 32 for movement freely axially within the can 32, i.e., in the direction indicated at 54 in FIG. 8. The weighted member 50 has a reduced diameter portion 56 which faces the wall 40 and in which the reed assembly 52 is contained. A bellows 60 (only partially shown in FIG. 14 for purposes of clarity) composed of a suitable thin flexible air-tight material is adhesively or otherwise suitably attached to the reduced diameter portion 56 about the entire circumference thereof and is adhesively or otherwise suitably attached to the inner disc 42 about the entire circumference thereof so as to provide an air-tight seal between the disc 42 and the weighted member 50 so that, when the bellows 60 is contracted, substantially all the air therein may be forced through the reed assembly 52 to create the desired sound. As air is released from the bellows, the weighted member 50 turns slightly (through an angle of, for example, about 30 degrees) to suitably fold the bellows to allow the weighted member 50 to approach the wall 40 and expel substantially all of the air therefrom. The weighted member 50 may, for example, have a thickness of about ¾ inch and a reduced diameter portion 56 thickness of about ¼ inch, with a length of travel of about 1 inch. The weighted member 50 has a weight, for example, about 2 ounces, to suitably effect release of air from the bellows 60 as it falls under the influence of gravity, as hereinafter described.

The surface of the reduced diameter portion 56 is hollowed out to define an elongate cutout, illustrated at 58, which extends diametrically thereof from just short of the reduced diameter portion edge at one end and terminating at the other end a short distance of, for example, about ¼ inch, from the reduced diameter portion edge, and has a width which varies from, for example, about ⅛ inch at the one end, flaring out to about 5/16 inch at the other end, as illustrated in FIG. 10. The depth of the cutout 58 may, for example, be about 3/16 inch. The reed assembly 52 is mounted in this cutout 58. The reed assembly 52 includes a trough 62 over which is laid one (or more) thin vibratory reed 64, and the members 62 and 64 are held together by a clamp member 66 near one end to allow the other end portion 68 to vibrate. The reed assembly members 62, 64, and 66 are made of plastic or other suitable material. The assembly 52 is laid in the cutout 58 so that the vibratory reed portion 68 is located in the flared out portion of the cutout 58, as seen in FIG. 10, and mounted in the cutout 58 by potting material, illustrated at 59, around the non-vibratory end portion of the reed 62 and corresponding end portion of the trough 64 or by other suitable means. It should be understood that a suitable diaphragm assembly may be provided instead of the reed assembly.

An air exit hole, illustrated at 70, having a diameter of, for example, about 3/16 inch, is located in the narrow end of the cutout 58 (opposite the flared part of the cutout) and extends axially all the way through the weighted member 50. The hole 70, for example, flares from about 1/8 inch to about 3/16 inch in diameter.

Figure 15:
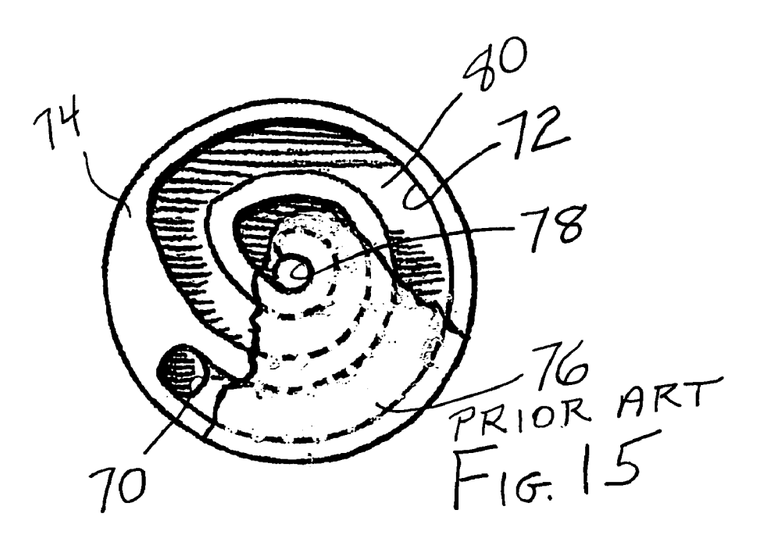
FIG. 15 is a plan view, with a portion shown partially torn away for purposes of clarity, of the front end of the weighted member.

Referring to FIG. 15, a spiral groove, illustrated at 72, is formed in the surface 74 of the weighted member which faces the wall 34, the spiral groove 72 terminating at one end in communication with the hole 70 and at the other end at the center of the weighed member surface 74. The spiral groove 72 has, for example, a width of about 1/8 inch and a depth of about 3/16 inch. The entirety of the surface 74 is covered by a sheet 76 of an air-tight cloth or paper or other suitable covering which is adhesively or otherwise suitably attached to the surface 74 to define a spiral back-pressure channel, illustrated at 80, for passage of the exit air in order to achieve a desired softness to the sound as needed for elk and deer. Only part of the sheet 76 is shown in FIG. 15 for purposes of clarity. The sheet 76 has a hole, illustrated at 78, centrally thereof which is in communication with the center of the spiral channel 80 for exit of the air, as illustrated at 82, and thereafter exit of the air from the call 30 through the holes 36, as illustrated at 38.

The discs 42 and 44 have aligned holes (holes in air flow communication with each other), illustrated at 84 and 86 respectively, which collectively define a hole 88 in the bellows 60 whose purpose is to prevent the call from inadvertently sounding while traveling, etc. Thus, the hole 88 in the bellows 60 must be covered or plugged by one's finger or thumb or otherwise to cause the call 30 to make a sound.

The call 30 is operated by alternately flipping the call over so that the front wall 34 alternately faces upwardly and downwardly. When the call 30 is turned so that the front wall 34 faces downwardly, the weighted member 50 moves under the force of gravity toward the front wall 34 thus causing the bellows 60 to expand, drawing in air. Then, with one's finger or thumb plugging the hole 88 in the bellows 60 to prevent air escape through the rear end wall closure of the bellows, when the call 30 is turned so that the front wall 34 faces upwardly, as in FIG. 1, the weighted member 50 moves under the force of gravity toward the rear wall 40 thus causing the bellows 60 to contract, expelling the air therein through the reed assembly 52. The air passes between the vibratory portion 68 of the reed 64 and the trough 62, out the other end of the trough 62 and through the hole 70, then through the spiral back-pressure passage 72, then through the hole 78 in the sheet 76, and finally exiting the call through the apertures 36 in the front wall 34, as illustrated at 38. As the air passes the vibratory portion 68, it causes it to vibrate or flutter against the upper edges 63 of the two side walls of the trough 62, making sounds which are softened by passage of the air through the back-pressure passage 72 to achieve a softness desired for deer and elk sounds and the like, a process of sound production which is well known to those of ordinary skill in the art to which this invention pertains.

The above-described BLEAT-IN-HEAT deer call 30 has worked well for many years. By using the hand cupped around the end of the call (the front wall 34), some limited variance in tone quality and volume may be obtained, but not completely satisfactorily and with some difficulty since it would be necessary to use both hands. The call 30 is nevertheless generally limited to only a single vocalization and the capacity of the bellows 60. As a result, hunters may often have found it desirable to carry around two such calls of different pitches (Quaker Boy's BLEAT-IN-HEAT deer call and BLEAT-IN-HEAT II deer call) for use. A more satisfactory and easier way of controlling sound quality (which will eliminate the necessity of carrying around two or more calls of different pitches) is considered desirable. In addition, the distracting movement (flipping it over and back) required to operate this call 30 may scare game away.

It is accordingly an object of the present invention to control sound quality (volume and pitch) of an internal bellows call such as the BLEAT-IN-HEAT deer call.

It is another object of the present invention to minimize distractions during use of such a call so that game is not scared away.

It is yet another object of the present invention to remotely control such a call.

In order to control sound quality (volume and pitch) of an internal bellows call such as the BLEAT-IN-HEAT deer call and without having to alternately flip the call over to operate it, in accordance with the present invention, the call is provided with a device for supplying pressurized air to the internal bellows.

In order to remotely control such a call, in accordance with the present invention, an air flow tube is provided to extend from the internal bellows to the air pressurization device.

The above and other objects, features, and advantages of the present invention will be apparent in the following detailed description of the preferred embodiments thereof when read in conjunction with the accompanying drawings wherein the same reference numerals denote the same or similar parts throughout the several views.

DETAILED DESCRIPTION OF THE PREFERRED EMBODIMENTS

Referring to FIGS. 2 to 6, there is shown generally at 100 a game call which includes the device 30 having the weighted member 50, reed assembly 52, bellows 60, rear wall 40 with hole 88, and other components as hereinbefore described in detail with reference to FIGS. 1 and 7 to 15.

While the device 30 works well to produce the specific sound for which it is designed, it is nevertheless limited to only a single vocalization and the capacity of the bellows 60. In addition, the distracting movement (flipping it over) required to operate this device may scare game away. In order to realize the advantages of such a device 30 while also controlling sound quality (volume and pitch) and without having to alternately flip the device over to operate it so that the intended game is not scared away, in accordance with the present invention, the call 100 includes an external hand-manipulatable (as by hand 104) bellows 102 or other device for supplying pressurized air to the internal bellows 60. The external bellows 102 is an elastomeric generally tubular member having a closed outer end and an open inner end which is sized to be press fitted over the rear end portion of the can 32. The external bellows 102 thus provides air pressure communication with the interior bellows via the hole 88 in the rear wall 40. The bellows 102 may, for example, be composed of thin rubber and have a length of about 4¾ inches and have its open end press fit onto the can 32 a distance of about ¾ inch and have a diameter equal approximately to the diameter of the can 32. It should however be understood that the external bellows 102 may be otherwise sized and shaped as suitable.

Figure 2:
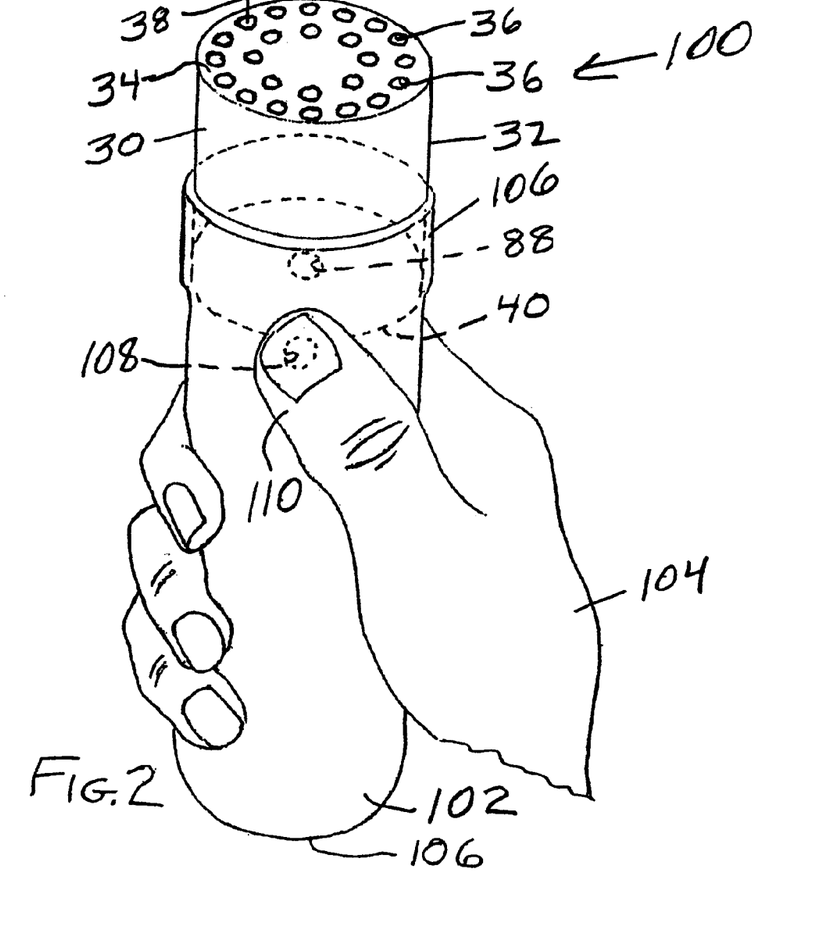
FIG. 2 is a perspective view of a game call which embodies the present invention and shown being held ready for use.

A hole, illustrated at 108, is provided in the external bellows 102 to prevent unwanted sounding of the call 100 while traveling, etc., and the user 104 must plug or cover this hole 108 with his thumb 110 or finger, as illustrated in FIG. 2, for the call 100 to work. Alternatively, a cap may be placed over the front end wall 34 to prevent air from escaping from the apertures 36 to prevent unwanted sounding of the call 100 while traveling, etc., the cap being removable for operating the call.

Figure 3:
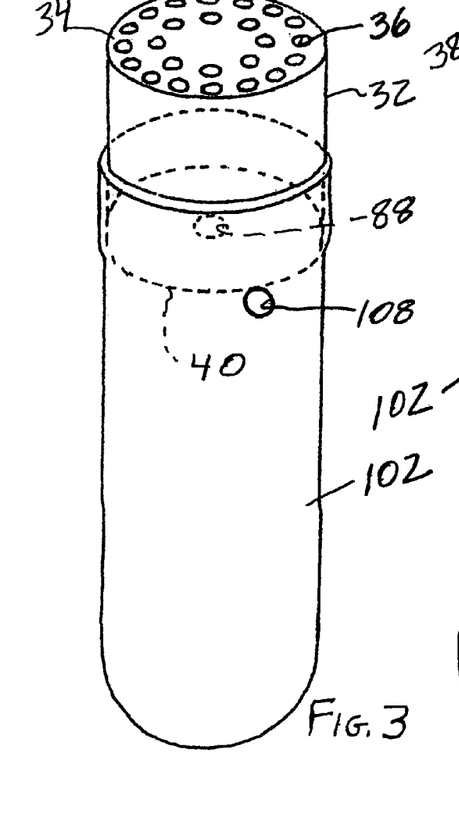
FIG. 3 is a perspective view of the game call prior to the making of a sound therewith.
Figure 4:
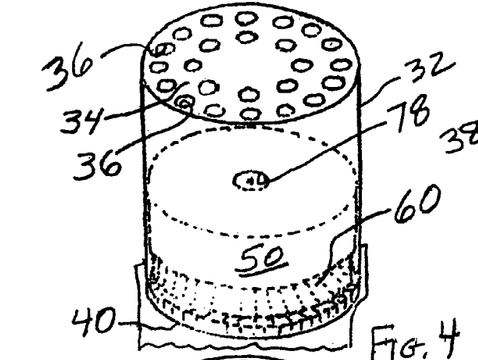
FIG. 4 is a partial perspective view of the game call as in FIG. 3, showing the locations of internal components thereof.
Figure 5:
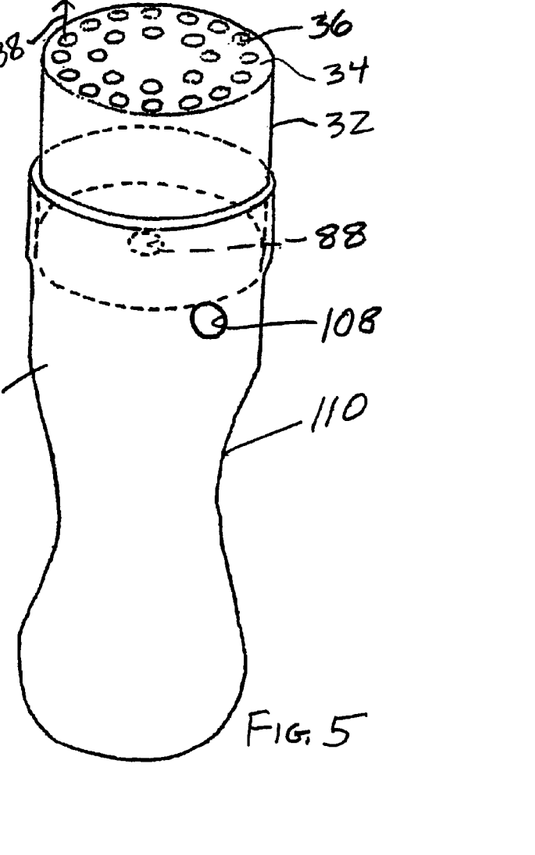
FIG. 5 is a perspective view of the game call during the making of a sound therewith.
Figure 6:
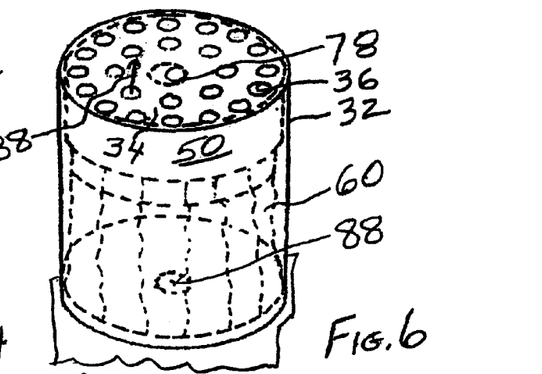
FIG. 6 is a partial perspective view of the game call as in FIG. 5, showing the locations of internal components thereof.

The external bellows 102 allows the user 104 to control sound quality (volume and pitch) by controlling how the external bellows 102 is squeezed. The inner bellows 60 acts as an air inflow regulator to the reed section 52 when the call 102 is used in an upright (front wall 34 up) position, as illustrated in FIGS. 3 to 6. Thus, the device 30 need not be flipped for calling but instead may be maintained in a position wherein the front or air outlet wall 34 is up. As shown in FIGS. 3 and 4, the internal bellows 60 is contracted and the weighted member is near the rear or air inlet wall 40 prior to use. By squeezing the external bellows 102, as illustrated at 110, with the thumb 110 or finger plugging or covering the hole 108, pressurized air is caused to flow through hole 88 into the inner bellows 60, then through the reed assembly 52, as hereinbefore discussed, causing the reed 64 to vibrate and make sound. The air then exits through the spiral restricted passageway channel 72, providing desired back pressure for suitably controlling the sound as desired, and exits through front wall apertures 36, as illustrated at 38.

By "restricted passageway" or "restricted air passage," as used herein and in the claims, is meant an air passageway exiting the reed assembly 52 or other sound-producing assembly which is restricted as compared to the air passage to the sound-producing assembly thereby producing a back pressure as air passes to and exits the sound-producing assembly. Thus, the restricted passageway 72 has a quite restricted passage as compared to the inner bellows 60 supplying air to the reed assembly 52. As a result, a back pressure is produced as the air exits the reed assembly 52 and enters and passes through the restricted passageway 72, thus allowing control of the sound being produced.

By "weighted member," as used herein and in the claims, is meant a member which is movable within a housing and has sufficient weight to fall under the influence of gravity (including overcoming any resistance such as support otherwise provided by a bellows attached thereto) when an air pressure causing the member to rise is removed. However, it is not required that the member be movable, and, if the member is movable, it is not required that it be so "weighted," especially if a spring or other force is provided to urge the member downwardly when the air pressure is removed.

Without wishing to be bound by theory herein, the following is Applicant's belief as to how the call 100 with the internal and external bellows works. The external bellows 102 may be squeezed gently to produce the desired soft sounds for calling deer and elk. If the external bellows 102 is squeezed more aggressively than needed to produce a subtle, soft, and calm vocalization (suitable for elk and deer), much more air is then forced into the device 30 through the hole 88 in the rear or divider wall 40. The weighted reed section 52 (which is sealed to the internal bellows 60) will then immediately rise upward (toward front wall 34), with the internal bellows 60 opening up (expanding) to act as a reservoir to capture the overflow or excess pressure and regulate the air flow to the reed 64, keeping it within the desired pitch tolerance.

The external bellows 102 can be manipulated however to purposely squeeze it more aggressively, causing an added influx of air into the device 30. It is believed that this added influx of air will cause an override in the internal bellows' regulation of air flow to the reed 64 and result in a controlled inflexion or rise in pitch of the vocalization, giving it personality or expressing a change in attitude or demi nor. It can be controlled to produce distress calls or alluring calls.

This feature of controlled pitch offers to the user the ability to sound out multiple vocalizations of different age groupings of game by varying the sound pitch. The young in most game species have higher pitched vocalizations than the old. This double-bellows call 100 thus gives the user the ability to produce vocalizations from the very young to the older segments of a game species.

This double-bellows call 100 also enables the user the option to produce a multitude of vocalizations in quick succession by squeezing the external bellows 102 rapidly, i.e., sounding like a group of game or birds instead of only one.

This double-bellows call 100 also allows the production of mating calls that can be loud or soft, that can vary in pitch and intensity (volume), depending on how aggressively the external bellows is squeezed. Similarly, it can also be used as a varmit call to allure predators. The varied calls may be produced with nearly no movement, i.e., without the aforesaid distracting flipping of the device 30.

By utilizing a different reed or multiple reeds, the pitch of the call may be varied to produce the high pitch squeals and squalls of rabbits and rodents in distress for the purposes of alluring predators into close range.

While the internal bellows 60 is desired, it should be understood that it is not required for the present invention. Thus, the internal bellows 60 may be eliminated and the plenum between the rear wall 40 and the weighted member 50 suitably sealed (such as by a friction fit or adhesive attachment of the weighted member 50 to the cylindrical wall of the can 32, whereby the weighted member remains stationary within the can 32) to provide air-tightness between the weighted member 50 and the cylindrical can wall, whereby the restrictive hole 88 in the rear wall 40 may provide regulation of air flow into the plenum to achieve the desired softness to the sounds produced. As used herein and in the claims, the term "plenum" is meant to refer to either the internal bellows 60 or, in the absence thereof, the space between the rear wall 40 and the weighted member 50.

Figures 16, 17, 18, 19:
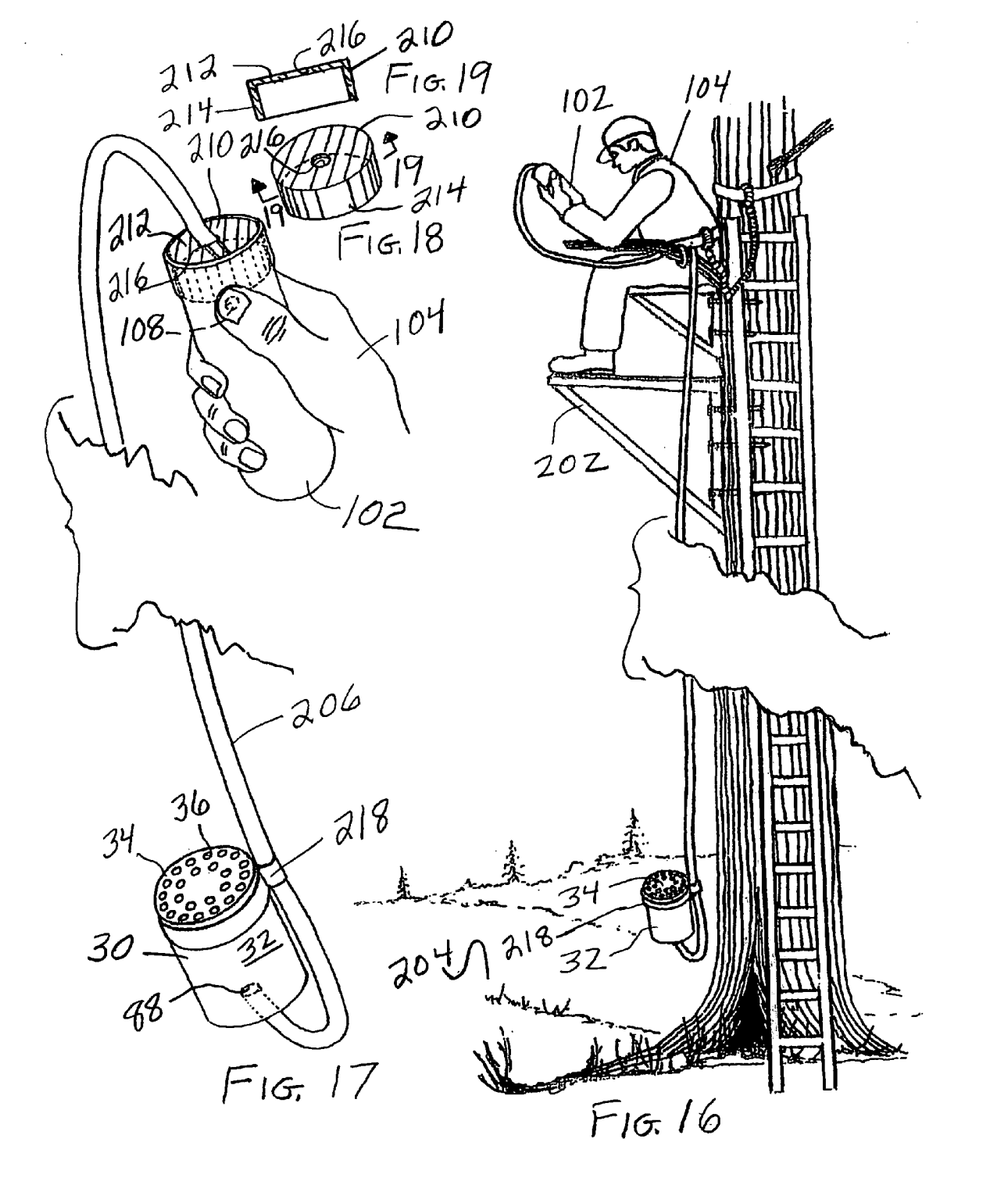
FIG. 16 is a perspective view of an alternative embodiment of the game call, shown in use.
FIG. 17 is a more detailed perspective view of the game call of FIG. 16.
FIG. 18 is a perspective view of a bellows cap for the game call of FIG. 16.
FIG. 19 is a sectional view of the cap taken along lines 19-19 of FIG. 18.

Referring to FIGS. 16 to 19, there is shown generally at 200 a remotely controlled game call in accordance with an alternative embodiment of the present invention. Call 200 includes the sound-making device 30 and the external bellows 102. As seen in FIG. 16, the user 104 is in a tree-stand 202 and has placed the call 200 on the ground 204 for use. In order to allow for remote operation of the call 200, an air passage conduit or tube 206 of a suitable length extends from the device 30 to the external bellows 102. One end portion 208 of the tube 206 is inserted into the hole 88, which is sized to make a tight sealing fit with the tube 206. A cylindrical plug member 210, which has a planar circular wall portion 212 from the edge of which extends a cylindrical wall portion 214, is inserted into the open end portion of the external bellows 102 so that the cylindrical wall portion 214 is received therein and is sized to make a tight sealing fit therewith. The planar wall portion 212 of the plug 210 has a hole, illustrated at 216, therein centrally thereof for receiving the other end portion of the conduit 206 and is sized to make a tight sealing fit with the tube 206. In order that the air outlet wall 34 face upwardly, the tube 206 is suitably attached to the can 32 adjacent the air outlet wall 34 such as by tape or other attachment device, illustrated at 218. Thus, the user 104 may remotely use the call 200 by squeezing the external bellows 102 at a remote location 202. The air passes from the external bellows 102 through the length of tubing 206 and into the internal bellows 60 or plenum within the device 30 for making a game sound as hereinbefore discussed.

It should be understood that the call 200 may be used without the external bellows 102. Thus, the bellows end portion 220 (which is shown as received in aperture 216) may instead be inserted in the user's mouth and air blown therein to supply the air for operating the device 30.

Figure 20:
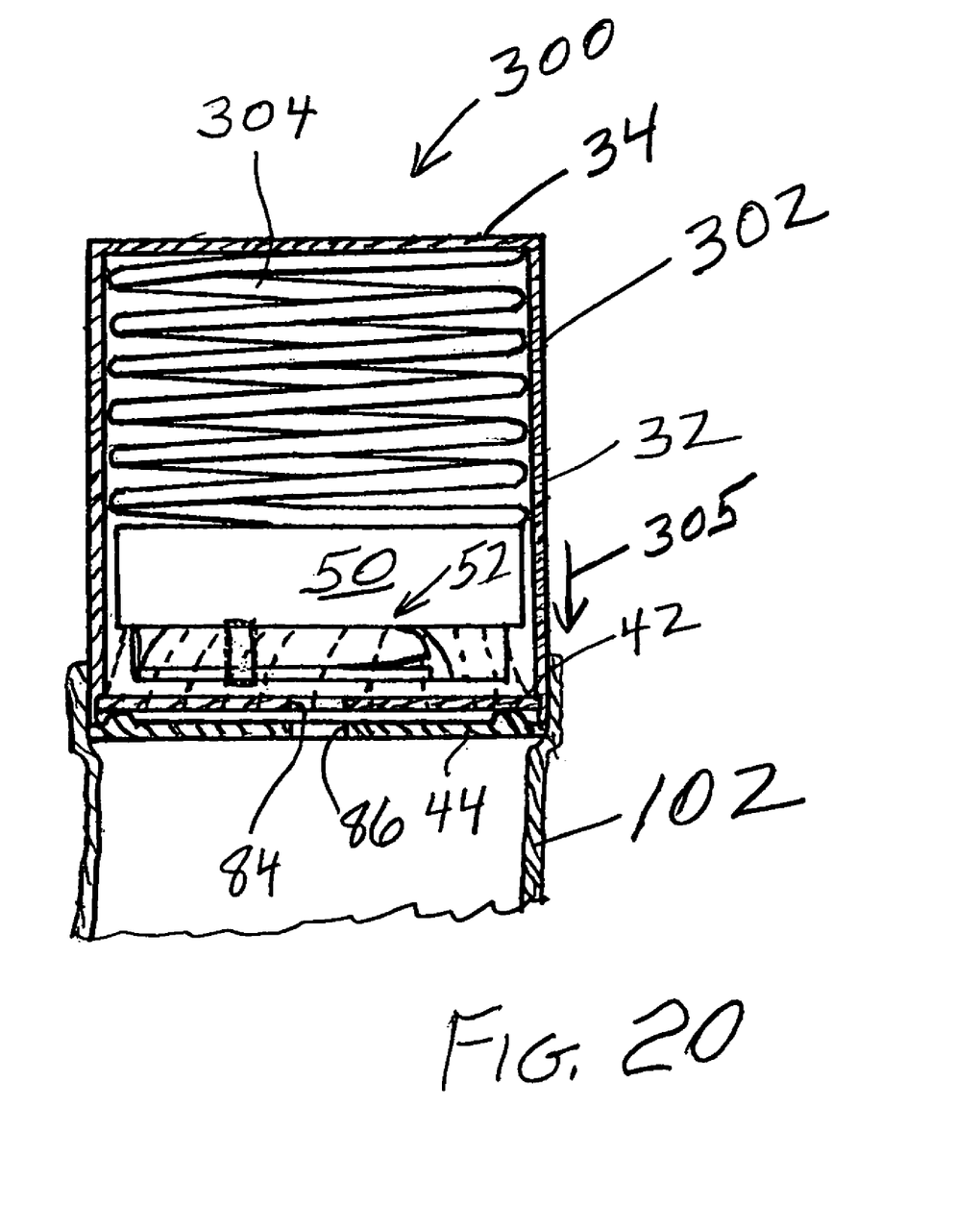
FIG. 20 is a sectional view (with parts not in section) of another embodiment of the game call.

Referring to FIG. 20, there is shown generally at 300 a game call in accordance with another embodiment of the present invention. Call 300 includes a sound-making device 302, which is similar to and contains all of the elements contained in device 30 and also contains a spring 304 which is received between the front wall 34 and the weighted member 50. External bellows 102 is connected thereto similarly as discussed for FIGS. 2 to 6. it is of course to be understood that the external bellows may be replaced with a tube 206 for remote operation (or other air pressurization means) and that the tube may in turn be blown into to provide air or attached at its other end to an external bellows, similarly as discussed with reference to FIGS. 16 to 19. The spring 304 may, for example, be composed of commercial grade round music wire having a diameter of about 0.051 inch, a rate of 0.457 lbs/inch, and a spring index of about 32.333, or may be otherwise suitably formed.

The spring 304 is provided to bias movement of the weighted member in a direction, illustrated at 305, toward the rear end or air inlet wall 40, i.e., causing the weighted member to tend to move toward the air inlet wall 40 unless acted on by a force such as provided by bellows 102 to overcome the spring force and thus force the weighted member to move toward the air outlet wall 34. This thusly allows the call 300 to be just as effectively used in any orientation. Thus, when the call 300 is used with, for example, one's hands or remotely from a tree stand, it does not matter whether it points upwardly or downwardly or sideways. The spring 304 further aids in controlling the ability to incur inflection into the calling.

Figures 21, 22, 23:
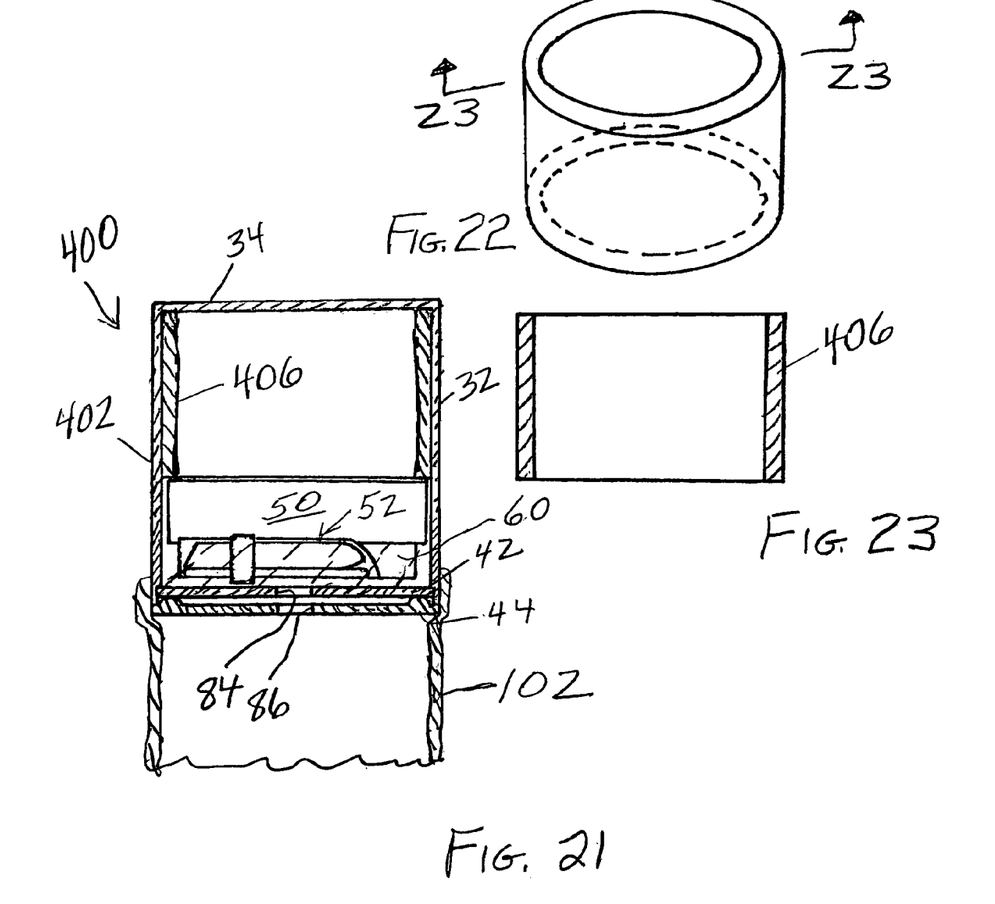
FIG. 21 is a view similar to that of FIG. 20 of another embodiment of the game call.
FIG. 22 is a perspective view of a spring member for the call of FIG. 21.
FIG. 23 is a sectional view of the spring member taken along lines 23-23 of FIG. 22.

Referring to FIGS. 21 to 23, there is shown generally at 400 a game call in accordance with another embodiment of the present invention. Call 400 includes a sound-making device 402, which is similar to and contains all of the elements contained in device 30 and also contains a cylindrical member 406 composed of spongy foam (a spongy or springy material such as that formed by the dispersal of gas bubbles in liquid rubber, plastic, or the like) or other suitable material which acts as a spring. The foam spring 406 is received between the front wall 34 and the weighted member 50 to control the ability to cincur inflection, similarly as discussed for the spring of FIG. 20. External bellows 102 is connected thereto similarly as discussed for FIGS. 2 to 6. It is of course to be understood that the external bellows may be replaced with a tube 206 for remote operation (or other air pressurization means) and that the tube may in turn be blown into to provide air or attached at its other end to an external bellows, similarly as discussed with reference to FIGS. 16 to 19.

It should be understood that, while the present invention has been described in detail herein, the invention can be embodied otherwise without departing from the principles thereof, and such other embodiments are meant to come within the scope of the present invention as defined by the appended claims.

What is claimed is:

1. A game call comprising a housing having an air inlet wall including at least one air inlet aperture and further having an air outlet wall, a member movable within said housing toward and away from said air inlet wall in response to pressurized air, at least one vibratory member mounted to said movable member for producing sounds in response to passage of air thereby, a restricted air passage downstream of said vibratory member for providing back pressure, an expandable and contractible bellows mounted within said housing and between said movable member and said air inlet wall for receiving air from said at least one air inlet aperture and for supplying air to said vibratory member for effecting vibration thereof, and a device for supplying air through said at least one air inlet aperture to said bellows.

2. A game call according to claim 1 wherein said vibratory member is a reed.

3. A game call according to claim 1 wherein said device is a hand-manipulable bellows externally connected to said housing.

4. A game call according to claim 3 further comprising a hole in said externally connected bellows to prevent the making of inadvertent sounds by the call.

5. A game call according to claim 1 wherein said device is a tubular member connected at one end thereof in air flow communication with said at least one air inlet aperture.

6. A game call according to claim 5 further comprising a hand-manipulable bellows connected to an other end of said tubular member in air flow communication therewith.

7. A game call according to claim 1 further comprising a spring disposed between said movable member and said air outlet wall to bias movement of said movable member in a direction away from said air outlet wall.

8. A game call comprising a housing including an air inlet wall having at least one air inlet aperture therein and an air outlet wall, a member movable in said housing in directions toward and away from said air inlet wall, said movable member having at least one vibratory member mounted thereto for producing sounds in response to passage of air thereby, a restricted air passage which is downstream of said vibratory member, an expandable and contractible bellows mounted within said housing and between said movable member and said air inlet wall for receiving air from said at least one air inlet aperture and for supplying air to said vibratory member for effecting vibration thereof, a device for supplying air through said at least one air inlet aperture to said bellows, and a spring disposed between said movable member and said air outlet wall to bias movement of said movable member in a direction toward said air inlet wall.

9. A game call according to claim 8 wherein said vibratory member is a reed.

10. A game call according to claim 8 wherein said device is a hand-manipulable bellows externally connected to said housing.

11. A game call according to claim 8 wherein said spring is a spongy foam member.

\* \* \* \* \*